United States Patent [19]

Scoles

[11] Patent Number: 5,869,814
[45] Date of Patent: Feb. 9, 1999

[54] POST-WELD ANNEALING OF THERMOPLASTIC WELDS

[75] Inventor: Roger W. Scoles, Andover, Kans.

[73] Assignee: The Boeing Company, Seattle, Wash.

[21] Appl. No.: 701,256

[22] Filed: Aug. 22, 1996

Related U.S. Application Data

[63] Continuation-in-part of Ser. No. 688,071, Jul. 29, 1996.

[51] Int. Cl.⁶ ........................................... H05B 6/10
[52] U.S. Cl. ..................... 219/633; 219/615; 219/618; 219/634; 228/157
[58] Field of Search ..................... 219/604–615, 219/633–636, 218; 228/157, 173, 243, 212, 263; 264/257

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,431,379 | 3/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt . |
| 4,180,717 | 12/1979 | Lenk et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,352,142 | 9/1982 | Olson . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,429,341 | 1/1984 | King . |
| 4,445,951 | 5/1984 | Lind et al. . |
| 4,479,163 | 10/1984 | Bannink, Jr. et al. . |

(List continued on next page.)

FOREIGN PATENT DOCUMENTS

| | | |
|---|---|---|
| 0 461 979 B1 | 4/1994 | European Pat. Off. . |
| 54-25542 | 2/1979 | Japan . |

OTHER PUBLICATIONS

J. Giachino, *Welding Skills And Practices*, Am. Tech. Soc., Chicago, IL (1960,1965,1967,1971,1976) 393 –401.

Border et al., *Induction Heated Joining of Thermoplastic Composites without Metal Susceptors*, 34th Int'l SAMPE Symp. May 8 –11, 1989, pp. 2569–2578.

*Primary Examiner*—Tu B. Hoang
*Attorney, Agent, or Firm*—John C. Hammar

[57] ABSTRACT

The present invention is a method for improving the strength and quality of thermoplastic welds by annealing the weld following its formation at a temperature of at least about 500° F. (i.e., about 125° F. below the melt) for about 20 minutes to control cooling of the weld.

1 Claim, 6 Drawing Sheets

U.S. PATENT DOCUMENTS

| | | |
|---|---|---|
| 5,688,426 | 11/1997 | Kirkwood et al. .................... 219/633 |
| 4,502,092 | 2/1985 | Bannink, Jr. et al. . |
| 4,521,659 | 6/1985 | Buckley et al. . |
| 4,542,056 | 9/1985 | Anglin et al. . |
| 4,599,255 | 7/1986 | Anglin et al. . |
| 4,653,396 | 3/1987 | Wennerberg . |
| 4,671,470 | 6/1987 | Jonas . |
| 4,673,450 | 6/1987 | Burke . |
| 4,755,904 | 7/1988 | Brick . |
| 4,768,433 | 9/1988 | Boissevain . |
| 4,791,260 | 12/1988 | Waldman . |
| 4,822,972 | 4/1989 | Sugioka et al. . |
| 4,839,771 | 6/1989 | Covey . |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,978,825 | 12/1990 | Schmidt et al. . |
| 5,001,319 | 3/1991 | Holmstrom . |
| 5,047,605 | 9/1991 | Ogden . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |
| 5,340,428 | 8/1994 | Kodokian . |
| 5,556,565 | 9/1996 | Kirkwood et al. .................... 219/633 |

POST-WELD ANNEALING OF THERMOPLASTIC WELDS

REFERENCE TO RELATED APPLICATION

The present application is a continuation-in-part application based upon U.S. patent application Ser. No. 08/688,071, filed Jul. 29, 1996, entitled "Susceptor Integration Into Reinforced Thermoplastic Composites".

TECHNICAL FIELD

The present invention relates to a process for improving the strength and quality of thermoplastic welds by annealing the welded assembly following creation of the weld to control the cooling of the bond line.

BACKGROUND ART

The use of composites in primary structure in aerospace applications is limited today because of the relatively high cost. A significant contribution to the total cost is the assembly cost where the precured composite elements are assembled, drilled, and fastened. The necessary design for mechanical fastening complicates the structure, especially in thin sections, because of the need for access to both sides of the bond line.

While composites might be adhesively bonded, cocured, or welded, these connecting processes generally produce bonds that rely upon the resin matrix for strength. The bond line lacks any reinforcing material to help with load transfer. These bonds generally have modest strength, and are susceptible to disbonding with shock impact or other "out of plane" forces affecting the assembly. Such forces often arise in environments prone to vibration.

1. Composite Manufacturing

Fiber-reinforced organic resin matrix composites have a high strength-to-weight ratio (specific strength) or a high stiffness-to-weight ratio (specific stiffness) and desirable fatigue characteristics that make them increasingly popular as a replacement for metal in aerospace applications where weight, strength, or fatigue is critical. Thermoplastic or thermoset organic resin composites would be more economical with improved manufacturing processes that reduced touch labor and forming time.

Prepregs combine continuous, woven, or chopped reinforcing fibers with an uncured matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension or fused into a single piece) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717 a flat composite prepreg panel was sandwiched between two metal sheets made from a superplastically formable alloy, and was formed against a die having a surface precisely contoured to the final shape of the part.

Attempts have been made to reduce composite fabrication times by actively cooling the tools after forming the composite part. These attempts have shortened the time necessary to produce a composite part, but the cycle time for heating and cooling remains long. Designing and making tools to permit their active cooling also increases their cost.

Boeing described a process for organic matrix forming and consolidation using induction heating in U.S. Pat. No. 5,530,227. There, Boeing laid up prepregs in a flat sheet sandwiched between aluminum susceptor face sheets. The face sheets were susceptible to heating by induction and formed a retort to enclose the prepreg preform. To ensure an inert atmosphere around the preform during curing and to permit withdrawing volatiles and outgassing during the consolidation, the face sheets are welded around their periphery. Such welding unduly increases the preparation time and the cost for part fabrication. It also ruined the face sheets (i.e., prohibited their reuse which added a significant cost penalty to each part fabricated with this approach). Boeing described in U.S. Pat. No. 5,599,472 a technique that readily and reliably sealed the face sheets of the retort without the need for welding and permitted reuse of the face sheets in certain circumstances. This "bag-and-seal" technique applies to both resin composite and metal processing.

2. Processing in an Induction Press

The dies or tooling for induction processing are ceramic because a ceramic is not susceptible to induction heating and, preferably, is a thermal insulator (i.e., a relatively poor conductor of heat). Ceramic tooling is strengthened and reinforced internally with fiberglass rods or other appropriate reinforcements and externally with metal or other durable strongbacks to permit it to withstand the temperatures and pressures necessary to form, to consolidate, or otherwise to process the composite materials or metals. Ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in Boeing's prior work, is sealed within the susceptor retort. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in the induction heating workcell do not heat to as high a temperature as the metal tooling of conventional, prior art presses, problems caused by different coefficients of thermal expansion between the tools and the workpiece are reduced. Furthermore, Boeing's induction heating press is energy efficient because significantly higher percentages of input energy go to heating the workpiece than occurs with conventional presses. The reduced thermal mass and ability to focus the heating energy permits change of the operating temperature rapidly which improves the products produced. Finally, the shop environment is not heated as significantly from the radiation of the large thermal mass of a conventional press. The shop is a safer and more pleasant environment for the press operators.

In induction heating for consolidating and forming organic matrix composite materials, Boeing generally places a thermoplastic organic matrix composite preform of PEEK or ULTEM, for example, within the metal susceptor envelope (i.e., retort). These thermoplastics have a low concentration of residual volatile solvents and are easy to use. The susceptor face sheets of the retort are inductively heated to heat the preform. Consolidation and forming pressure consolidate and, if applicable, form the preform at its curing temperature. The sealed susceptor sheets form a pressure zone in the retort in a manner analogous to conventional vacuum bag processes for resin consolidation. The retort is placed in an induction heating press on the forming surfaces of dies having the desired shape of the molded composite part. After the retort and preform are inductively heated to the desired elevated temperature, differential pressure (while maintaining the vacuum in the pressure zone around the preform) across the retort which functions as a diaphragm in the press forms the preform against the die into the desired shape of the completed composite panel.

The retort often includes three, stacked susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time to help form the composite panel or workpiece. The shared wall of the three layer sandwich that defines the two pressure zones acts as the diaphragm.

Boeing can perform a wide range of manufacturing operations in its induction heating press. These operations have optimum operating temperatures ranging from about 350° F. (175° C.) to at least about 1850° F. (1010° C.). For each operation, Boeing usually holds the temperature relatively constant for several minutes to several hours to complete the operations. While temperature can be controlled by controlling the input power fed to the induction coil, a better and simpler way capitalizes on the Curie temperature. Judicious selection of the metal or alloy in the retort's susceptor face sheets avoids excessive heating irrespective of the input power. With improved control and improved temperature uniformity in the workpiece, Boeing produces better products. The method capitalizes on the Curie temperature phenomenon to control the absolute temperature of the work-piece and to obtain substantial thermal uniformity in the workpiece by substantially matching the Curie temperature of the susceptor to the desired temperature of the induction heating operation being performed. The Curie temperature is generally slightly above the processing temperature. With thermoplastic welding, for example, it might be the melt temperature of the matrix resin plus about 1°–75° F. (preferably 5°–25° F.) so that the bond line remains in the processing window without excessive heating. This temperature control method is explained in greater detail in our U.S. Pat. No. 5,723,849.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

In contrast, thermoplastic welding, which eliminates fasteners, joins thermoplastic composite components at high speeds with minimum touch labor and little, if any, pretreatments. A conventional welding interlayer tape (compromising the susceptor and surrounding thermoplastic resin either coating the susceptor or sandwiching it) also can simultaneously take the place of shims required in mechanical fastening. As such, composite welding promises to be an affordable joining process. For "welding" a combination of thermoplastic and thermoset composite parts together, the resin that the susceptor melts functions as a hot melt adhesive. If fully realized, thermoplastic-thermoset bonding in addition to true thermoplastic welding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psig through the electrodes, and heated the embedded graphite fibers by applying a voltage in the range of 20–40 volts at 30–40 amps for approximately 5–10 seconds with the electrodes. Access to both sides of the assembly was required in this process which limited its application.

Prior art disclosing thermoplastic welding with induction heating is illustrated by U.S. Pat. Nos. 3,966,402 and 4,120,712. In these patents, conventional metallic susceptors are used and have a regular pattern of openings of traditional manufacture. Achieving a uniform, controllable temperature in the bond line, which is crucial to preparing a thermoplastic weld of adequate integrity to permit use of welding in aerospace primary structure, is difficult with those conventional susceptors.

Thermoplastic welding is a process for forming a fusion bond between two faying thermoplastic faces of two parts. A fusion bond is created when the thermoplastic on the surface of the two thermoplastic composite parts is heated to the melting or softening point and the two surfaces are brought into contact, so that the molten thermoplastic mixes. The surfaces are held in contact while the thermoplastic cools below the softening temperature.

The same process parameters apply essentially to hot melt thermoplastic adhesive bonds between prefabricated thermoset composite bonds.

Simple as the thermoplastic welding process sounds, it is difficult to perform reliably and repeatably in a real factory on full-scale parts to build a large structure such as an airplane wing box. One difficulty is heating the bond line properly without overheating the entire structure. Another difficulty is achieving intimate contact of the faying surfaces of the two parts at the bond line during heating and cooling because of (1) the normal imperfections in the flatness of composite parts, (2) thermal expansion of the thermoplastic during heating to the softening or melting temperature, (3) flow of the thermoplastic out of the bond line under pressure (i.e., squeeze out), and (4) contraction of the thermoplastic in the bond line during cooling.

The exponential decay of the strength of magnetic fields with distance from their source dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some cases, destruction or denaturing of the resin. To avoid overheating of the outer plies and to insure adequate heating of the inner plies, we use a susceptor of significantly higher conductivity than the fibers to peak the heating selectively at the bond line instead of in the composites themselves. To create a weld, an electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, either condition leading to inferior welds because of non-uniform curing. An open or mesh pattern in the susceptor embedded at the bond line allows the resin to create the fusion bond between the composite elements of the assembly when the resin heats and melts.

a. Moving coil welding processes

In U.S. Pat. No. 5,500,511, Boeing described a tailored susceptor for approaching the desired temperature uniformity. This susceptor, designed for use with the cup coil of U.S. Pat. No. 5,313,037, relied upon carefully controlling the geometry of openings in the susceptor (both their orientation and their spacing) to distribute the heat evenly. The susceptor had a regular array of anisotropic, diamond shaped openings with a ratio of the length (L) to the width (W) greater than 1. This susceptor produced a superior weld by producing a more uniform temperature than obtainable using a susceptor having a similar array, but one where the L/W ratio was one. Changing the length to width ratio (the aspect ratio) of the diamond-shaped openings in the susceptor produced a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, Boeing altered the current density in regions near the edges by increasing the foil density (i.e., the absolute amount of metal). Increasing the foil density along the edge of the susceptor increases the conductivity along the edge and reduces the current density and the edge heating. Boeing increased foil density by folding the susceptor to form edge strips of double thickness or by compressing openings near the edge of an otherwise uniform susceptor. These susceptors were difficult to reproduce reliably. Also, their use forced careful placement and alignment to achieve the desired effect.

The tailored susceptor was designed to use with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

The selvaged susceptor for thermoplastic welding which is described in U.S. Pat. No. 5,508,496 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. Pat. No. 5,444,220, which we incorporate by reference), because it provides (1) a controllable area of intense, uniform heating under the poles of the coil; (2) a trailing region with essentially no heating; and (3) a leading region with minor preheating.

Boeing achieved better performance (i.e., more uniform heating) in rib welding by using a selvaged susceptor having edge strips without openings. The resulting susceptor, then, has a center portion with a regular pattern of openings and solid foil edges, referred to as selvage edge strips. The susceptor is embedded in a thermoplastic resin to make a susceptor/resin tape that is easy to handle and to use in preforming the composite pieces prior to welding. Also, with a selvaged susceptor, the impedance of the central portion should be anisotropic with a lower transverse impedance than the longitudinal impedance. Here, the L/W ratio of diamond shaped openings should be less than or equal to one. With this selvaged susceptor in the region immediately under the asymmetric induction work coil, current flows across the susceptor to the edges where the current density is lowest and the conductivity, highest.

Generally, the selvaged susceptor is somewhat wider than normal so that the selvage edge strips are not in the bond line. Boeing sometimes removes the selvage edge strips after forming the weld, leaving only a perforated susceptor foil in the weld. This foil has a relatively high open area fraction.

Another difficulty remaining in perfecting the thermoplastic welding process for producing large scale aerospace structures in a production environment involved control of the surface contact of the faying surfaces of the two parts to be welded together. The timing, intensity, and schedule of heat application must be controlled so the material at the faying surfaces are brought to and maintained within the proper temperature range for the requisite amount of time for an adequate bond to form. Intimate contact is maintained while the melted or softened material hardens in its bonded condition.

Large scale parts, such as wing spars and ribs, and the wing skins that are bonded to the spars and ribs, are typically on the order of 20–30 feet long at present, and potentially as much as 100 feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "I" beam flanges, and small scale surface defects such as asperities and depressions. These irregularities interfere with full surface area contact between the faying surfaces of the two parts and actually result in surface contact only at a few "high points" across the intended bond line. Applying pressure to the parts to force the faying surfaces into contact achieves additional surface contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "I" beam flanges to the softening point, so they begin to yield or sag under the application of the pressure needed to achieve a good bond.

Boeing's multipass thermoplastic welding process described in U.S. Pat. No. 5,486,684 (which we incorporate by reference) enables a moving coil welding process to produce continuous or nearly continuous fusion bonds over the full area of the bond line. The result is high strength welds produced reliably, repeatably, and with consistent quality. This process produces improved low cost, high strength composite assemblies of large scale parts fusion bonded together with consistent quality. It uses a schedule of heat application that maintains the overall temperature of the structure within the limit in which it retains its high strength. Therefore, it does not require internal tooling to support the structure against sagging which otherwise could occur when the bond line is heated above the high strength temperature limit. The process also produces nearly complete bond line area fusion on standard production composite parts having the usual surface imperfections and deviations from perfect flatness. The multipass welding process eliminates fasteners and the expense of drilling holes. inspecting the holes and the fasteners, inspecting the fasteners after installation, sealing between the parts and around the fastener and the holes; reduces mismatch of materials; and eliminates arcing from the fasteners.

In the multipass process, an induction heating work coil is passed multiple times over a bond line while applying pressure in the region of the coil to the components to be welded, and maintaining the pressure until the resin hardens. The resin at the bond line is heated to the softening or melting temperature with each pass of the induction work coil and pressure is exerted to flow the softened/melted resin in the bond line and to reduce the thickness of the bond line. The pressure improves the intimacy of the faying surface contact with each pass to improve continuity of the bond. The total time at the softened or melted condition of the thermoplastic in the faying surfaces is sufficient to attain deep interdiffusion of the polymer chains in the materials of the two faying surfaces throughout the entire length and area of the bond line. The process produces a bond line of improved strength and integrity in the completed part. The total time of the faying surfaces at the melting temperature is divided up which allows time for the heat in the interface to dissipate without raising the temperature of the entire structure to the degree at which it loses its strength and begins to sag. The desired shape and size of the final assembly is maintained.

A structural susceptor includes fiber reinforcement within the weld resin to alleviate residual tensile strain otherwise present in an unreinforced weld. This susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, Boeing prefers to use at least two plies of fiber reinforcement on each side of the susceptor. This structural susceptor is described in greater detail in U.S Pat. No. 5,717,191, which we incorporate by reference.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which are too wide to create a quality weld using the conventional susceptors.

It is easy to tailor the thickness of the structural susceptor to match the measured gap by scoring through the appropriate number of plies of resin and fiber reinforcement and peeling them off. In doing so, a resin rich layer will be on both faying surfaces and this layer should insure better performance from the weld.

b. Fixed coil induction welding

Thermoplastic welding using Boeing's induction heating workcell differs from the moving coil processes because of the coil design and resulting magnetic field. The fixed coil workcell presents promise for welding at faster cycle times than the moving coil processes because it can heat multiple susceptors simultaneously. The fixed coil can reduce operations to minutes where the moving coil takes hours. The keys to the process, however, are achieving controllable temperatures at the bond line in a reliable and reproducible process that assures quality welds of high bond strength. The fixed coil induces currents to flow in the susceptor differently from the moving coils and covers a larger area. Nevertheless. proper processing parameters permit welding with the induction heating workcell using a susceptor at the bond line.

Another advantage with the fixed coil process is that welding can occur using the same tooling and processing equipment used to consolidate the skin, thereby greatly reducing tooling costs. Finally, the fixed coil heats the entire bond line at one time to eliminate the need for shims that are currently used with the moving coil. To control the temperature and to protect against overheating, "smart" susceptors as a retort or as the bond line susceptor material or both are used.

The need for a susceptor in the bond line poses many obstacles to the preparation of quality parts. The metal which is used because of its high susceptibility differs markedly in physical properties from the resin or fiber reinforcement so dealing with it becomes a significant issue. The reinforced susceptor overcomes problems with conventional susceptors by including the delicate metal foils (0.10–0.20 inch wide×0.005–0.010 inch thick; preferably 0.10×0.007 inch) in tandem with the warp fibers of the woven reinforcement fabric. The weave fibers hold the foils in place longitudinally in the fabric in electrical isolation from each other yet substantially covering the entire width of the weld surface while still having adequate space for the flow and fusion of the thermoplastic resin. Furthermore, in the bond line, the resin can contact, wet, and bond with the reinforcing fiber rather than being presented with the resin-philic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will focus.

The strength and durability of adhesive bonds or thermoplastic welds connecting composite structure is improved, however, by adding Z-pin mechanical reinforcement to the bond line, as taught in Boeing's copending U.S. Patent Applications. We have also discovered that weld strength can be improved with a post-weld anneal to control cooling of the bond line.

SUMMARY OF THE INVENTION

The present invention is a method for improving the strength and quality of thermoplastic welds by annealing the weld following its formation. The anneal occurs at a temperature of at least about 500° F. (i.e., about 125° F. below the melt) for about 20 minutes to control cooling of the weld.

DETAILED DESCRIPTION OF A PREFERRED EMBODIMENT

First, some discussion about thermoplastic welding using Boeing's induction heating press before focusing on the post-weld annealing process of the present invention. We can use this press both to manufacture detail parts or to join parts into welded assemblies.

1. The Induction Heating Press

Figure 1:
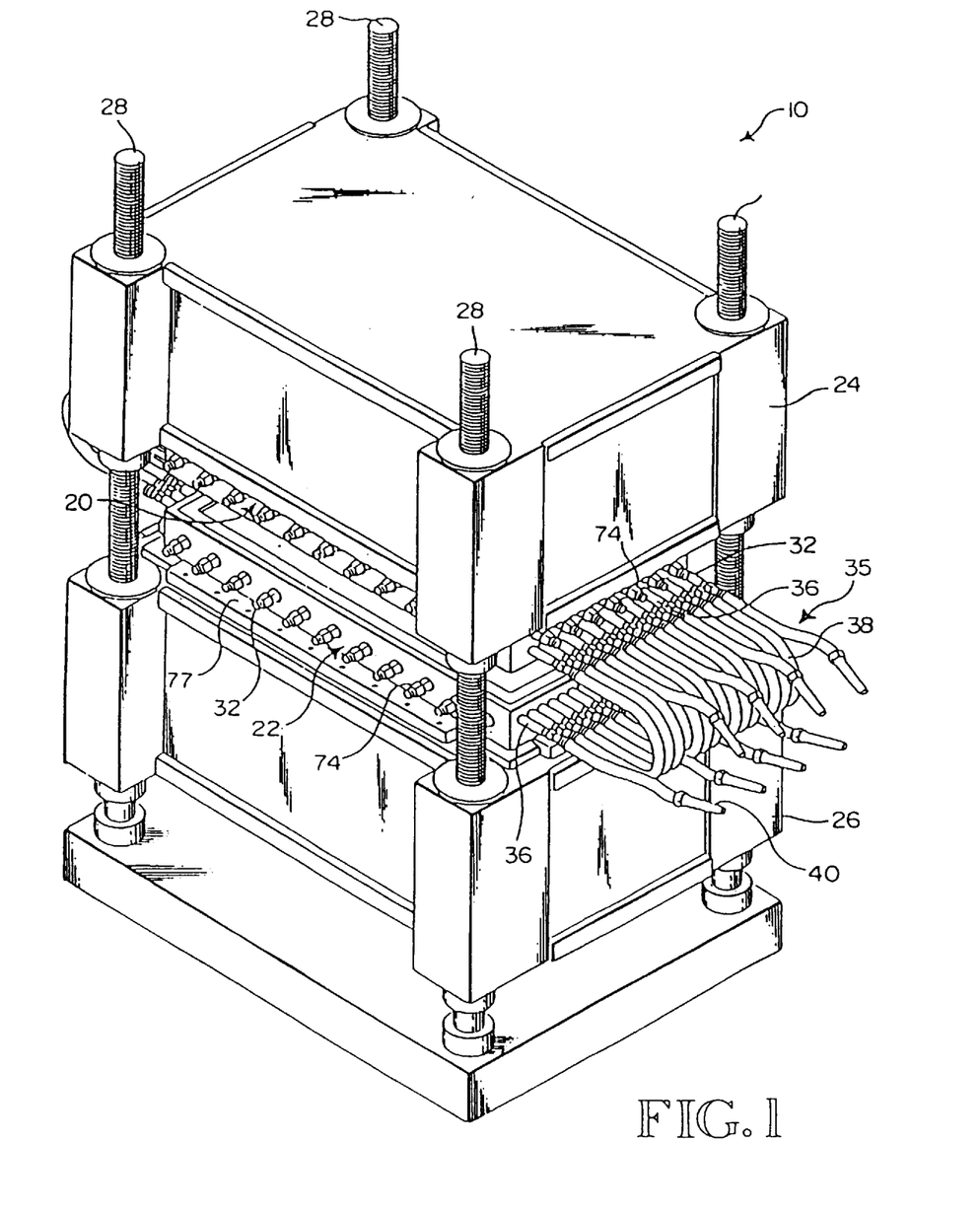
FIG. 1 is a perspective view of Boeing's induction heating workcell.

In FIG. 1, an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. Turning the jackscrews moves one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 in/ft² of the forming surface. Such tolerances are desirable to achieve proper part tolerances. The strongbacks may be steel, aluminum, or any other material capable of handling the loads present during forming or consolidation, but we prefer materials that are nonmagnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually ceramic and are reinforced with a plurality of fiberglass rods 32 that are held with bolts 74 and that extend both longitudinally and transversely in a grid through each die. Each die usually is framed with phenolic reinforcement 72 as well to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort rather than distributed in the press as well. The ceramic has a low coefficient of thermal expansion, good thermal shock resistance. and relatively high compression strength, such as a castable fused silica ceramic.

Figure 3:
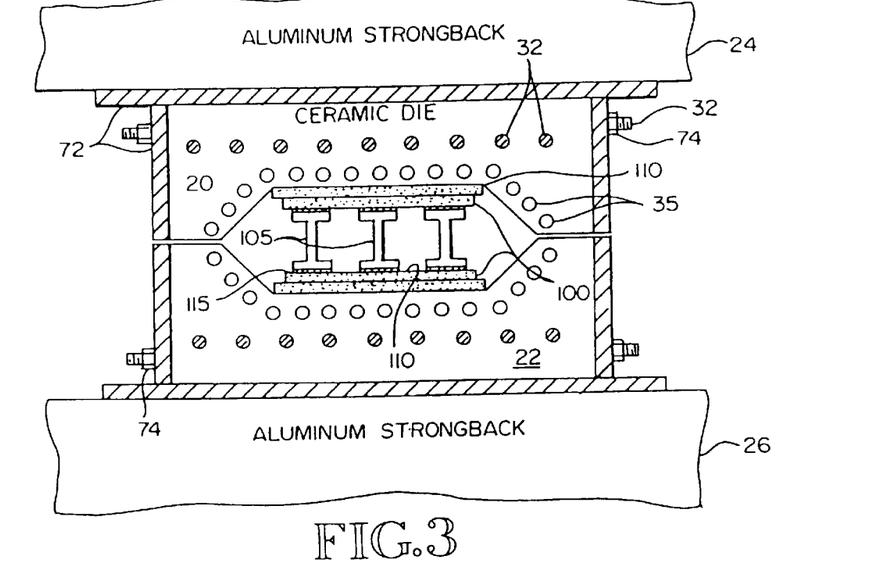
FIG. 3 is a schematic cross-sectional view of the induction heating workcell adapted for thermoplastic welding of a wingskin/spar assembly.

Boeing embeds portions of an induction coil 35 in the dies. In the illustrated embodiment, four separate induction segments overlie the top and bottom of the workpiece, but the number can vary, as shown in FIG. 3, and the segments can surround all sides of the workpiece. The segments shown in FIG. 3 are formed from a straight tubing section 36 that extends along the length of each die and a flexible coil connector 38 that joins the straight tubing sections 36 in the upper die 20 to the corresponding straight tubing section in the lower die 22. Other arrangements might be used with the intent to create a known, controllable magnetic field suitable for the welding operation. Connectors 40 located at the ends of the induction coil 35 connect the induction coil 35 to an external power source or coil driver 50 and to a coolant source. While illustrated as a circular tube, the cross-section is arbitrary. We often use rectangular channels for the induction segments.

Figure 2:
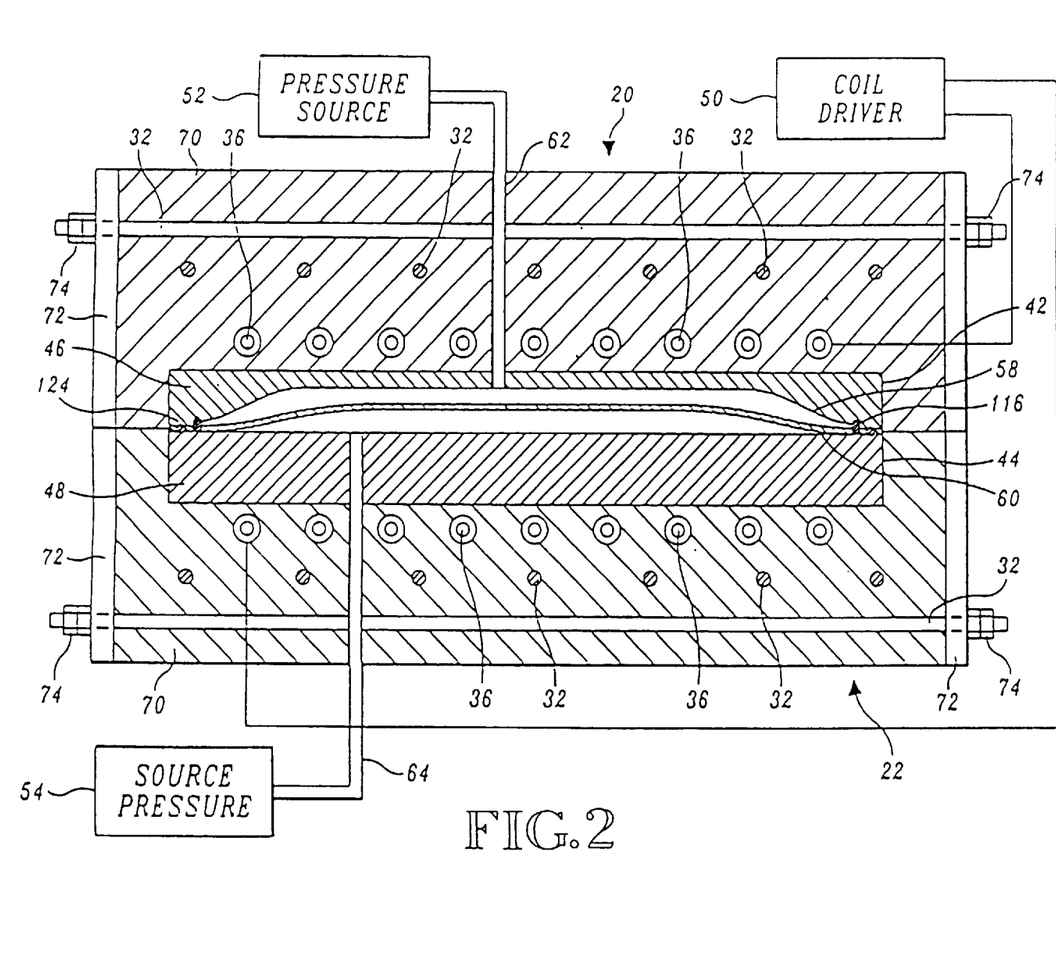
FIG. 2 is a schematic cross-sectional view of the induction heating workcell of FIG. 1.

Cavities 42 and 44 in the respective dies hold tool inserts 46 and 48. The upper tool insert 46 in some applications has a contoured forming surface 58 that has a shape corresponding to the desired shape of the outer mold line surface of the completed composite. The lower tool insert determines the inner mold line. The tool inserts also should not be susceptible to inductive heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. Boeing prefers ceramic tooling which provides the greatest flexibility and versatility for the induction heating workcell.

While the forming surfaces can be an integral part of the dies, we might use the separate die and tool insert configuration shown in FIG. 2 because changing tool inserts to make different parts is easier and quicker (because they are significantly smaller) and the overall tooling costs are reduced.

Each die surrounds and supports the respective tool insert and holds the straight sections 36 of the induction coil in proper position in relationship to the tool insert 46 or 48. In the preferred embodiment, the interior 70 of the dies is formed of a castable phenolic or ceramic and the exterior sides from precast composite phenolic resin blocks 72. In some applications, with chopped fibers or nonwoven or woven reinforcing mats reinforce the phenolic or ceramic.

FIG. 2 shows a retort 60 between the tool inserts 46 and 48. The retort 60 includes an organic matrix composite panel or metal workpiece and sandwiching susceptor face sheets. The retort is heated to a forming or consolidation temperature by energizing the coil 35. In the case of a composite panel, when the panel reaches the consolidation temperature at which the matrix resin flows, we apply gas pressure to the outer surfaces of the retort by pressure sources 52 and 54. Pressure source 52 applies pressure to the upper surface of the retort 60 through a conduit 62 that passes through the upper die 20 and upper tool insert 46, while pressure source 54 applies a pressure to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure to the retort 60. We do not always use a retort.

An alternating oscillating electrical current in the induction coil 35 produces a time varying magnetic field that heats the susceptor sheets of the retort via eddy current heating. The frequency at which the coil driver 50 drives the coils 35 depends upon the nature of the retort 60. We power the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The tool inserts and dies are usually substantially thermally insulating and trap and contain heat within the retort. Since the dies and tool inserts are not inductively heated and act as insulators to maintain heat within the retort, the induction workcell requires far less energy to achieve the desired operating temperature than conventional autoclave or resistive hot press methods where the metal tooling is a massive heat sink.

The operations using Boeing's fixed coil workcell are faster than prior art operations because the workcell does not heat the large thermal mass of either the dies or tool inserts. The retort or bond line susceptor is heated, the tool is not. Thus, the necessary processing temperature is achieved more rapidly. In addition, the highly conductive materials in the retort provide rapid heat transfer to the workpiece. When the driver 50 is de-energized, the dies and the retort cool rapidly to a temperature at which we can remove the retort from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools allowing better tailoring of the thermocycle better to the process for which we are using the induction heating workcell.

A more complete description of the press is provided in copending U.S. Pat. No. 5,723,849, which we incorporate by reference.

2. Thermoplastic Welding

Figure 4:
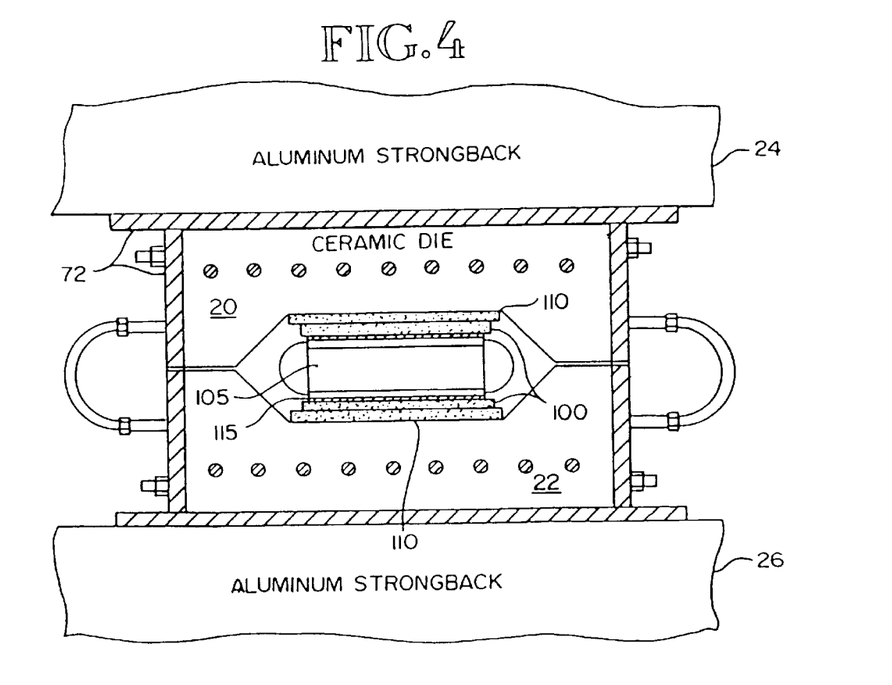
FIG. 4 is another schematic cross-sectional view of the workcell of FIG. 3 rotated 90° from the view in FIG. 3.

As shown in FIGS. 3 & 4, Boeing has made several changes to its induction heating workcell to adapt it to perform bond line thermoplastic welding. The assemblies of primary interest are wingskin/spar combinations. The parts in these combinations are prefabricated so that the welding operation need only focus upon melting the thermoplastic while applying modest pressure to facilitate the fusion. Therefore, Boeing creates a cavity within its dieset to contain the wingskin/spar combinations. The cavity is substantially a cube or similar rectangular solid with canted edges and has major surfaces (i.e., the top and bottom) complementary to the contour of the wing assembly. The induction coil segments extend longitudinally in the same direction as the spars and underlie the major and canted surfaces as shown in FIG. 3. The skins 100 and spars 105 are assembled in the center of the cavity sandwiched between optional, silicone rubber pressure pads 110 that assure substantially uniform pressure distribution over the wingskin surfaces irrespective of surface features or irregularities. A susceptor tape 115 is positioned along the bond line between the wingskin 100 and the spar caps. By a "susceptor tape" we mean (1) a metal ribbon embedded in thermoplastic resin, (2) a structural susceptor as described in U.S. Pat. No. 5,717,191 having the resin-embedded ribbon sandwiched with alternating plies of thermoplastic film and fiber reinforcement to alleviate residual tensile strain in the weld and to simplify gap filling while ensuring a resin rich, quality weld, or (3) a reinforced susceptor as described in U.S. Pat. No. 5,723,849. The metal ribbon may be copper, a nickel-cobalt alloy, a nickel-iron alloy, a cobaltiron alloy, or any other suitable "smart" susceptor from the alternatives discussed in U.S. Pat. No. 5,728,309. The susceptor might be narrow metal strips about 0.10–0.20 inch wide held in side-by-side array with the thermoplastic resin or woven with carbon fibers or other reinforcement. The induction coil induces eddy currents that run longitudinally. Therefore, the susceptor should have a lower longitudinal impedance to promote longitudinal current flow. We might use a modified, selvaged susceptor (see U.S. Pat. No. 5,508,496) having solid copper bands alternating with mesh sections with the solid bands in the bond line rather than falling outside it, since they are the primary current carriers. We can also integrate the susceptor tape into one face of the detail parts forming the assembly, when using the process of the present invention.

A "susceptor tape," however, still suffers from a relatively low bond strength because the metal susceptor is asked to function as the equivalent of a reinforcing fiber. The matrix resin, however, does not wet with the metal as well as it does with the reinforcing fibers and the metal does not have the strength commonly available with the fibers. Therefore, a reinforced susceptor promises improved bond strength.

Figure 5:
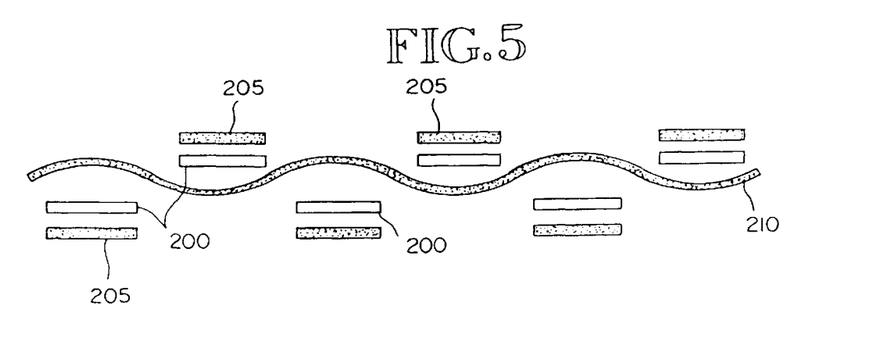
FIG. 5 is a schematic sectional view of a reinforced susceptor.

The need for a susceptor in the bond line poses many obstacles to the preparation of quality parts. The metal which is used because of its high susceptibility differs markedly in physical properties from the resin or fiber reinforcement so dealing with it becomes a significant issue. The reinforced susceptor (FIG. 5) overcomes problems with conventional susceptors by including the delicate metal foils 200 (0.10–0.20 inch wide×0.005–0.010 inch thick; preferably 0.10×0.007 inch) in tandem with the warp fibers 205 of the woven reinforcement fabric. The weave fibers 210 hold the warp fibers 205 and foils 200 in place longitudinally in the fabric in electrical isolation from each other yet substantially covering the entire width of the weld surface while still having adequate space for the flow and fusion of the thermoplastic resin. Furthermore, in the bond line, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will form. The reinforced susceptor might be an analog of the structural, selvaged, or tailored susceptors of Boeing's other applications (i.e. a tape encased in resin and placed along the bond line) or may be fabricated as part of the facing plys of the prefabricated composites that abut along the bond line.

Figure 6:
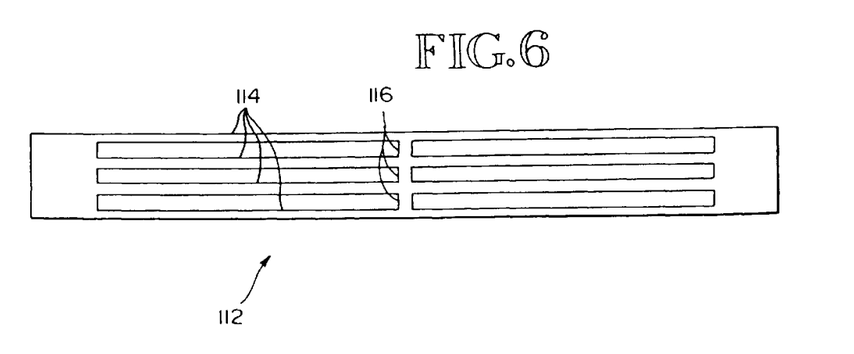
FIG. 6 is a plan view of a multistrip susceptor that is weavable into the fabric to form the reinforced susceptor.

The foil in the susceptor may be in the form of a multistrip susceptor 112 as shown in FIG. 6. The foil includes two or more parallel strips 114 that extend the full length of the strip. The foil is usually about 0.007 inch thick and each strip is about 0.10–0.20 inch wide. The strips are separated by gaps of comparable width or slightly wider dimension which we etch or ablate from a solid foil. Along the length of the susceptor, we periodically use transverse spacer strips 1 16 to span the gap and to retain the carrier strips 114 apart. While shown as four strips wide, the foil can be virtually any width. It can be about two—four inches wide to match the spar cap width or might even be the full width of sheets of the composite prepreg used to form the skins. Dimensions given are typical and could be varied.

As shown in FIG. 4, the susceptors for the top and bottom are connected together into a loop circuit with jumpers 115 at the ends of the spars 105. The jumpers 115 allow the current which the magnetic field induces to flow around the assembly to generate heat in the bond lines.

With the wingskin/spar combination assembled on the pressure pads in the cavity, we close the dies and energize the coil 35 using a frequency of about 3–10 kHz to produce about 400 kW. This energy produces an oscillating magnetic field around the assembly (which preferably is aligned with the central axis of the coil) that rapidly heats the susceptors to the desired welding temperature. Using a "smart" susceptor made from a nickel-iron alloy as discussed in U.S. Pat. No. 5,728,309 will assure that we do not overheat the bond line while achieving a substantially uniform temperature in the bond line during the fusion period when the thermoplastic resin is melted. As shown in FIG. 3, we simultaneously make all the welds (one weld on each spar cap of the three spars), which greatly reduces processing time. The welding process is quite fast taking about 25–30 minutes including heating to the melt, holding the temperature during the weld fusion, and cooling. Throughout the process, we maintain a pressure of about 30–50 psig along the bond line. The weight of the assembly may make the pressure slightly higher on the bottom than the top but this pressure difference should be insignificant to the quality of the weld and the performance of the completed part.

The welding process might cause the combination to sag when the bond line reaches the melt temperature where the flow needed for focusing the fusion bond occurs. Therefore, it may be necessary to support the assembly from the inside. Boeing's preferred support concept is described in U.S. Pat. No. 5,710,414 and involves using high temperature silicone rubber balloons or other inflatable devices to fill the spaces defined by the assembled skins and spars. Other tooling might also be used, such as filling the space with salt or another material that we can later dissolve, including ceramics. If support tooling is used, the part design must be such that the support tooling can be removed after the welds are formed. In this case, for example, the combination cannot have completely closed cavities. It generally will not because ribs are omitted from the assembled combination, since welding ribs transverse to the magnetic field is troublesome. The need to remove the support tooling can severely impact the parts we can fabricate.

The integrity of the weld is critical to the performance of the completed, welded structure. The quality of the weld is related to the temperature along the bond line and good welds require control of the temperature within a relatively narrow range during the welding. We particularly want to avoid overheating, so a "smart" susceptor made from a Co, Ni, or Fe alloy with a Curie temperature slightly above the melting temperature of the resin will help ensure that we produce quality welds. By "slightly above" we mean within about a processing window for the resin where a weld will form but the resin will not denature or pyrolyze and the composite will not delaminate. This window extends from the melt temperature ($T_g$) to about $T_g+75°$ F. Furthermore, an alloy like Invar 42 (42% Ni—58% Fe) has a coefficient of thermal expansion (CTE) comparable to the resin composite so that embedding the susceptor into the completed part will not have as dramatic an impact if the susceptor is such an alloy rather than copper or another metal where the CTE mismatch between the resin and susceptor is larger.

Suitable thermoplastic resins include polyimides, PEEK, PEK, PEKK, PES, PPS, TORLON (i.e. PEI), or the like. It is especially suited, however, for consolidation or forming of resins that have low volatiles content and that are nonreactive (i.e., the true thermoplastics like PEEK or ULTEM).

The surface of an aircraft wing skin must be maintained to a close tolerance to achieve an efficient aerodynamic surface. The tolerances of the inner mold line surface of the wing skin must also be maintained at a close tolerance at least in a buildup area where the wing skin will be joined to a spar to ensure that the wing skin and spar can be precisely joined. It is not as critical, however, to control the inner mold line surface in areas where the wing skin is not attached to other structures. The composite panel has additional plies to define the buildup areas. The additional reinforcement of the composite panel in these areas which is necessary where a spar will be attached, and provide a convenient way to match the skin and spar to produce the desired outer wing configuration even if the spars are imprecise in their dimensions. We can fabricate built up areas at the faying surfaces to provide the precision fit, in this way we can eliminate shims.

In conventional thermoplastic welding, the susceptor is a separate element and may be in sheet, mesh, expanded, milled, selvaged or other suitable form. The susceptor should be structured for the optimum conductivity longitudinally and transversely needed to obtain controlled, reliable, and reproducible heating. Geometry and structure are closely related to the type of induction head used, as those of ordinary skill will understand. along the bond line. Integrated, the susceptor still needs to have all the favorable properties of the conventional, separate susceptor.

While we prefer to align the longitudinal metal foil strips in the mutlistrip susceptor with the coil segments, other orientations between the strips and coil might be used, and such orientations are undoubtedly necessary to use if we elect to simultaneously weld ribs, spars, and closeouts.

Throughout this discussion, we use "composite" to mean a fiber reinforced organic resin matrix material. The fibers should be of suitable strength to make aerospace structural parts, such as graphite, fiberglass, or carbon fibers. The organic resin can be a thermosetting resin, such as epoxy or bismaleimnide, or a thermoplastic, such as ULTEM or KIIIB polyimide, as we previously described.

Figure 7:
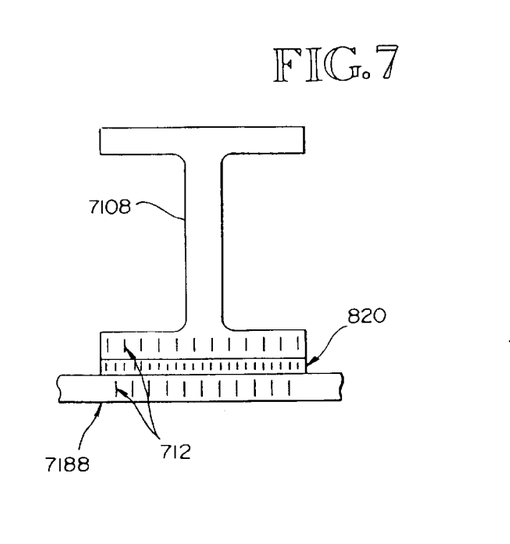
FIG. 7 is a schematic sectional view illustrating a bond line of a welded assembly.

As shown in FIG. 7, the spar detail part 710a includes a stubble surface of Z-pins so that a padup strip 820 ends up having pins extending upwardly from the panel 18a as well as downwardly from the spar flange 10a. The pins might be carried in a padup strip with stubble on both faces with longer, integral pins if the detail parts are thermoplastic rather than inserting the pins into the spar and panel prior to their curing.

In a thermoplastic welding process, the padup strip 820 might include a susceptor for interacting with an oscillating magnetic field to generate eddy currents sufficient to melt and cure the bond line resins and to form a weld. This strip could have the susceptor adjacent one surface so that the strip would be the analog of one of our integrated susceptor detail part, albeit a thin one. Generally, however, the susceptor would be centrally located in the strip in which case there would be little benefit from the susceptors in our detail parts if induction were used to heat the susceptor. Of course, if the part carried an integral susceptor and the strip included a susceptor, for welding in the fixed coil induction heating press, a loop circuit could be fashioned by adding jumpers between the part and strip. Also, the multiple susceptors might be suited for resistance heating. Boeing prefers to reduce the amount of metal at the bond line so we prefer a single susceptor design.

We can use any other arrangement to get the appropriate heating at the bond line when completing the weld. If welding and Z-pinning, Boeing prefers to use pins in the detail parts that penetrate further into the parts than the region which softens during the formation of a fusion bond between the details. In this way, the pins stay firmly anchored in their desired orientation. We can heat the bond line through the susceptor with induction or resistance heating.

Figure 8:
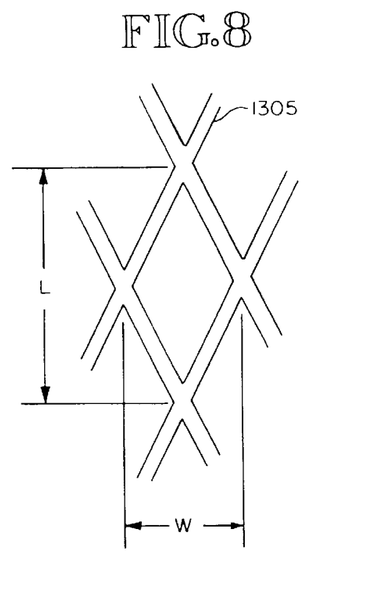
FIG. 8 is a detail showing the mesh of an integrated susceptor.

As shown in FIG. 8, the susceptor 1300 typically comprises a metal mesh 1305 encased in a resin 1310. The susceptor of FIG. 8 includes selvage edge strips 1315. The mesh 1305 includes a repeating pattern of diamond shaped openings of length (L) and width (W) separated by fine-line elements.

For combining the integrated susceptor and Z-pins we might simply apply a metal foil which the pins piece on insertion to yield a patterned susceptor. We suspect, however, that it would be difficult to obtain controlled heating of this pierced susceptor reliably from part to part and configuration to configuration. Therefore, we prefer to position the pins in the pre-existing openings of the expanded foil. The susceptor might be fashioned as Kirkwood et al. suggested in U.S. patent application Ser. No. 08/486,560 as a "barbed wire" analog. Alternatively, the susceptor might be of the reinforced design woven and aligned with the associated fiber in the reinforcing fabric. Then, the fibers will protect the delicate foil when the pins are inserted.

3. An Integrated Susceptor

Figure 9:
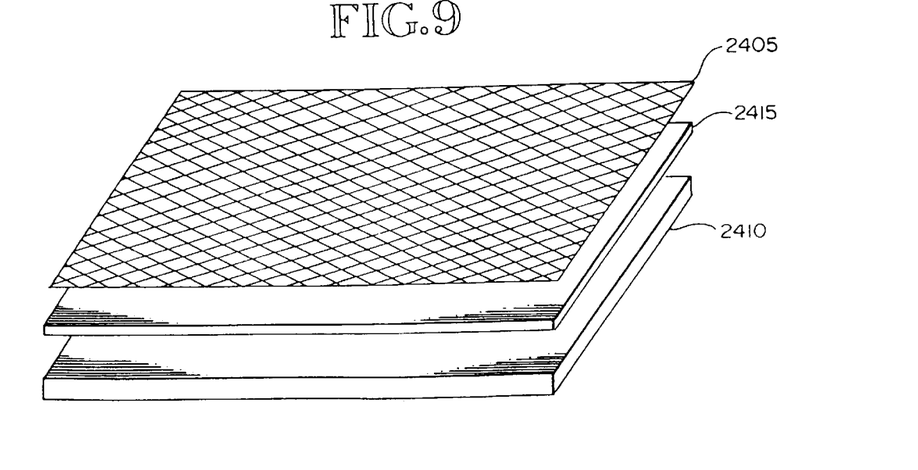
FIG. 9 is a schematic exploded view of a detail part having an integrated susceptor along the bond line surface.

Now turning to the integrated susceptor as shown in FIG. 9, we bond the susceptor 2405 to the detail part 2410 along the bond line using an intermediate thermoplastic film 2415. The susceptor typically is a 5 mil thick copper foil, but it may be tailored, selvaged, "smart," reinforced, structural, or any other susceptor configuration described in Boeing's patents and patent applications. The intended application for the detail part and its method of final assembly factor into the decision on the appropriate susceptor. While our focus is primarily with induction thermoplastic welding, the susceptor can be heated resistively or by any other effective method. While FIG. 9 shows the susceptor 2405 over the entire surface of the part, typically the susceptor will be adhered in only a small portion of the surface corresponding essentially to the area of the bond lines. If the entire surface is covered, of course, definition of the bond line can wait until the detail parts are assembled, but precise identification of the bond line with a narrow susceptor is the approach we prefer. Placing the susceptor at a fixed location on the faying surface of the detail makes it easier to accurately locate the susceptor at the bond line interface because the susceptor is tied to one of the interfacing detail parts. Accurate placement is important, especially for the induction process, because the time-varying magnetic field that the coils generate induces uneven heating if the coil and susceptor are misaligned. This problem of alignment is discussed in greater detail in U.S. patent application Ser. No. 08/564,566, which we incorporate by reference. Also, integrating the susceptor with the detail part protects the delicate foil against damage, helps us to assemble complex curvatures, and lends itself to process automation by reducing part count and positioning dexterity.

We can prepare the integrated susceptor while laying up the detail part in fiber placement or prepreg manufacturing operations or can add the susceptor to a prefabricated detail part. When working with prepregs, at the intended location of the bond line, we add a thermoplastic film to the prepreg surface to make the surface resin rich. Then, we overlay the susceptor on the thermoplastic film. We consolidate and cure the preform in conventional autoclave operations to prefabricate the integrated susceptor detail part. In resin transfer molding, we position the film and susceptor or simply the susceptor in the appropriate place in the mold before injecting the resin around the fiber preform.

For prefabricated detail parts, we prepare the surface of the part in the intended location of the susceptor with an alcohol wipe. Then, we position the thermoplastic film 2415 and susceptor 2405 in the same manner as we did for the prepreg manufacture. We tack the film and susceptor in place with KAPTON high temperature tape and place the preform in a heated oven to melt the thermoplastic film. When the preform is heated appropriately, we remove the hot part from the oven and press the susceptor to consolidate the susceptor and thermoplastic film with the prefabricated detail.

The film 2415 assures us of a resin rich surface at the weld. We might add reinforcing fiber to the film or over the film or in the bond line to alleviate residual tensile strain in the weld.

The part geometry we tested generally was without contour or with simple contour at a relatively large radius of curvature (for example, about 115 inches). The composites were about 0.100–0.250 inches thick. The bond line was about two inches wide. The susceptor was copper foil about 5 mils thick patterned to achieve substantially uniform heating on the bond line. With these parameters and suitable backup phenolic tooling to retain the assembly geometry, we achieved joints having an average strength of about 7000±350 psi

4. Post-weld Annealing

Figure 10:
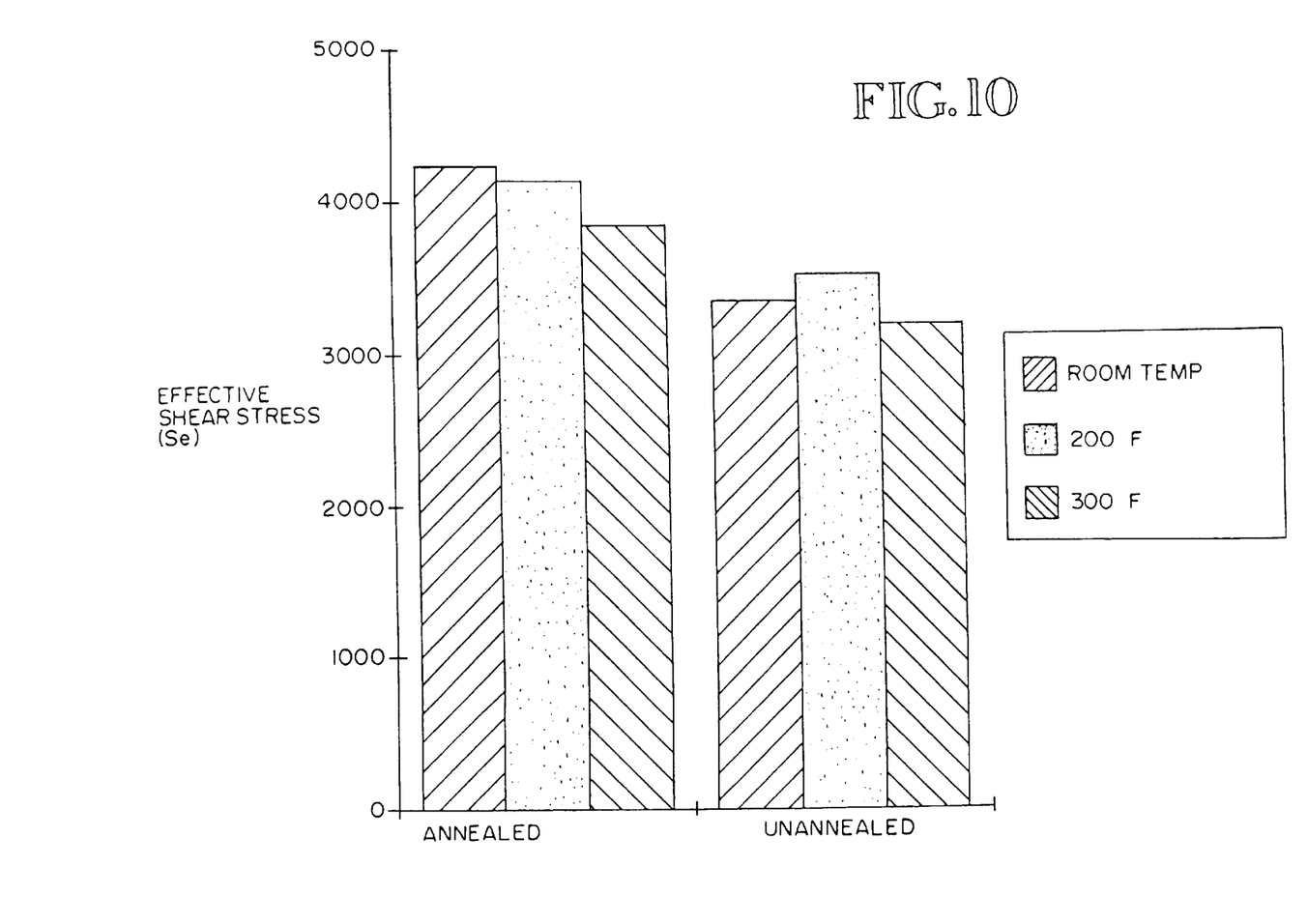
FIG. 10 is a graph illustrating the increase in strength for a thermoplastic weld obtained with a post-weld anneal to control the rate of cooling in the bond line.

I investigated process alternatives using a preheating step as well as a postweld anneal to control the cooling of the bond line, and those experiments lead me the annealing process of the present invention. FIG. 10 graphs the improvement I measured. I conducted the preheating tests at 200° F. and 300° F., respectively. Annealing involved retaining the assembly at 500° F. for 20 minutes. I conducted the heating in an oven at atmospheric pressure.

I discovered that there was little advantage with preheating, but that the post-weld anneal and its controlled cooldown offered a significant strength improvement and a higher quality weld. Parts made with the anneal also showed lower process variance.

The anneal was about 125° F. below the resin's melt temperature. The strength enhancement I achieved was considerable in the range of about 15–25%. I have not determined the optimal annealing conditions for all the resin systems or welded assembly configurations, and have not modeled the physical phenomena that produce added strength as a result of the annealing. At the temperatures I used, I assume I achieve some mobility in the resin or relieve tensile strain otherwise occurring at the bond line. I also have not fully explored the optimal duration of the anneal. Twenty minutes produced the significant strength increases shown in FIG. 10. Longer or short cycles or even multiple cycles might prove to be more effective. I combine the welding and annealing processes so that the bond line cools slowly with a plateau in its cooling at 500° F. I might be able to obtain the same strength increase, however, with other cooling cycles that result in the bond line temperature exceeding 500° F. for the 20 minutes or so of the anneal. That is, the anneal might actually be a slow cooldown over the 20 minute anneal cycle at about 5°–6° F./minute from the welding temperature of about 620° F. to 500° F.

While I have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

I claim:

1. A method for welding at least two prefabricated resin composite detail parts using a susceptor defining a bond line for joining the details parts with a fusion bond, comprising the step of:

annealing the fusion bond by holding the bond at a temperature of at least 500° F. for 20 minutes.

\* \* \* \* \*

UNITED STATES PATENT AND TRADEMARK OFFICE
CERTIFICATE OF CORRECTION

PATENT NO. : 5,869,814

DATED : February 9, 1999

INVENTOR(S) : Roger W. Scoles

It is certified that error appears in the above-identified patent and that said Letters Patent is hereby corrected as shown below:

At Column 15, Line 60, "piece"
    should read -- pierce --

At Column 17, Line 8, " "±350 psi"
    should read -- ± 350 psi. --"

At Column 18, Line 31, please add:

"2. The method of claim 1 wherein the annealing involves a slow cooldown.

"3. The method of claim 1 wherein the bond includes polyimide, PEK, PEEK, PEKK, PPS, PES, or PEI.

UNITED STATES PATENT AND TRADEMARK OFFICE
CERTIFICATE OF CORRECTION

PATENT NO. : 5,869,814

DATED : February 9, 1999

INVENTOR(S) :
Roger W. Scoles

It is certified that error appears in the above-identified patent and that said Letters Patent is hereby corrected as shown below:

"4. The method of claim 1 wherein the bond includes reinforcing fiber in sufficient amount to alleviate residual tensile strain.

"5. The method of claim 1 wherein the anneal occurs within about 125°F of a melt temperature for resin in the bond.

"6. The method of claim 1 wherein the bond includes Z-pin reinforcement."

Signed and Sealed this

Twenty-seventh Day of July, 1999

Attest:

Q. TODD DICKINSON

*Attesting Officer*   *Acting Commissioner of Patents and Trademarks*